Sept. 1, 1925.                                                          1,551,696
                            J. S. REYNOLDS
                        DUAL CONTROL FOR AUTOMOBILES
                            Filed Aug. 11, 1921
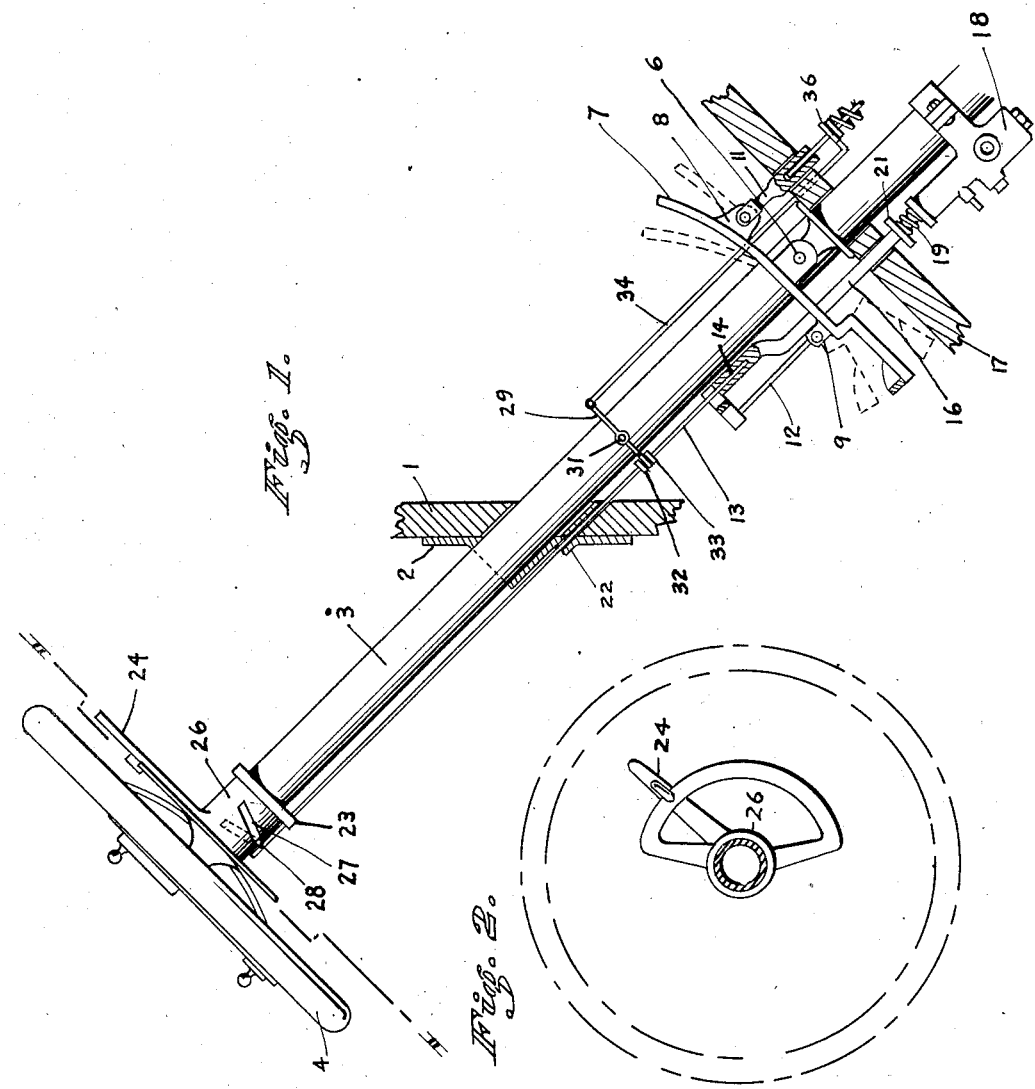
INVENTOR.
Joy S. Reynolds
BY
Bradley L. Benson
ATTORNEY.

Patented Sept. 1, 1925.

1,551,696

UNITED STATES PATENT OFFICE.

JOY S. REYNOLDS, OF SAN FRANCISCO, CALIFORNIA.

DUAL CONTROL FOR AUTOMOBILES.

Application filed August 11, 1921. Serial No. 491,455.

*To all whom it may concern:*

Be it known that I, JOY S. REYNOLDS, a citizen of the United States of America, residing at San Francisco, in the county of San Francisco and State of California, have invented certain new and useful Improvements in Dual Controls for Automobiles, of which the following is a specification.

The present invention is an improved dual control for automobiles.

The primary object of the invention is to provide a control for an automotive vehicle which may be selectively operated either by hand (at the steering wheel) or by foot (by a floor pedal), either of which operations is independent of the other and each of which is effective to either accelerate or retard the movement of the vehicle.

Another object is to produce a control for the brake elements of an automotive vehicle by means of which the brakes may be applied instantaneously without change of position by a driver and obviate the loss of time incidental to such change.

A distinct advantage of my control hereinafter described lies in the fact that the entire control of the movement of the car is governed by one foot, thus leaving the hands of the driver free for driving and signalling operations.

In this sepcification and the annexed drawings, the invention is illustrated in the form considered the best, but it is to be understood that the invention is not limited to such form, because it may be embodied in other forms, and it is also to be understood that in and by the claims following the description it is desired to cover the invention in whatever form it may be embodied.

In the accompanying one sheet of drawings, Fig. 1 is an elevation of a typical steering column supported on a fragment of floor, showing my control in relation thereto.

Fig. 2 is section taken on the line II—II of Fig. 1.

Referring to the drawings, the numeral 1 indicates a fragment of the dash of an automobile. At 2 I indicate a bracket adapted to support a steering column 3 surmounted by the usual hand wheel 4. Pivoted as shown at 6 is a pedal 7 provided with lugs 8 and 9 for pivotally engaging respectively an accelerator push rod 11 and a pull rod 12 adapted to apply brake elements through means to be later described.

The pull rod 12 is bent at an angle and bifurcated at the top to slidably straddle a rod 13. The rod 13 extends at the lower end into a bore 14 in the top end of a push rod 16 slidable through the floor 17 and adapted to control a pressure regulator valve 18 of a liquid brake system.

This pressure valve is fully described and claimed in my co-pending application for patent filed August 13, 1921, Serial No. 491,947 and its relation to the brake elements is explained in my co-pending application for patent filed April 26, 1921, Serial No. 464,693.

The push rod 16 is normally held up by a spring 19 bearing at one end against the regulator 18 and at the opposite end against a collar 21 secured to rod 16.

The rod 13 slides in a bearing 22 in the bracket 2 and in a bearing 23 near the head of the steering column.

In order to control the pressure regulator 18 from the hand wheel, I provide a lever 24 secured to a sleeve 26 rotatably mounted on the steering column 3. This sleeve is provided with a cam slot 27 adapted to engage a pin 28 extending through rod 13. As the sleeve 26 is rotated by the lever 24, the cam slot reciprocates rod 13 endwise, to depress (on the down stroke) the rod 16.

To afford a hand control for accelerator rod, I provide a lever 29 pivoted at 31 on the column 3. One end of lever 29 straddles rod 13 and engages collars 32 and 33 secured to said rod. The opposite end of lever 29 is pivotally attached to one end of link 34, the opposite end of which is split and straddles the accelerator rod to engage (on the down stroke only) a collar 36 thereon.

When the parts are in the neutral position shown in full lines in the drawing, the pin 28 is at the approximate center of cam slot 27. Obviously a movement of lever 24 in a clockwise direction will apply the braking element while a counter clockwise movement of this lever will operate the accelerator.

It will also be seen that either of these operations may be effected by the pedal 7 without affecting the hand control.

What I claim as new and desire to secure by Letters Patent of the United States, is:—

1. An automobile control, comprising, a braking mechanism, an accelerator mechanism, a pedal operatively connected to both said mechanisms, a rod adapted to oscillate said pedal in one direction only, and a spring adapted to oscillate said pedal in opposition to said rod.

2. An automobile control, comprising, braking and accelerator mechanisms, and a steering post, a sleeve oscillatably mounted on said post in proximity to the steering wheel, a cam on said sleeve operating by the oscillation thereof, a rod engaging and reciprocated by said cam, connections between said rod and the braking and accelerator mechanisms, and a lever interposed between one of said mechanisms and the rod, whereby the reciprocation of said rod cuts in one or the other of said mechanisms, according to the direction of its reciprocation.

3. An automobile control, comprising, braking and accelerator mechanisms, means for cutting in either of said mechanisms but not the other, said means operated by foot power, and means for cutting in either of said mechanisms but not the other, said means operated by hand power.

4. An automobile control, comprising, braking and control mechanisms, means for cutting in either of said mechanisms, but not the other, by foot power, and means for cutting in either of said mechanisms, but not the other, by hand power, and automatic means for reversing said operations.

5. An automobile control, comprising braking and accelerating mechanisms, a foot lever connected to said mechanisms at opposite sides of its fulcrum, and a hand operated lever having a one way connection with said mechanisms.

In testimony whereof I affix my signature.

JOY S. REYNOLDS.